Aug. 21, 1923.
O. W. J. CHESTER
TETHERING PEG
Filed Nov. 13, 1922
1,465,806
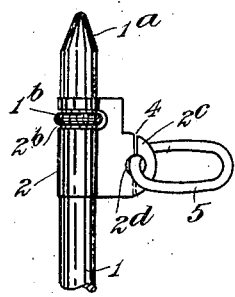
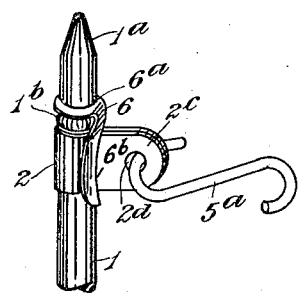
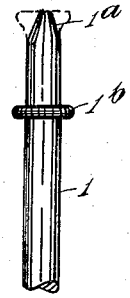
Fig.1.   Fig.2.   Fig.3.
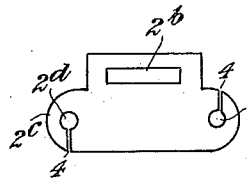
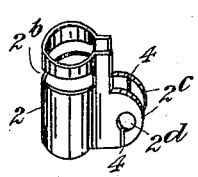
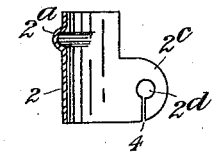
Fig.4.   Fig.5.   Fig.6.
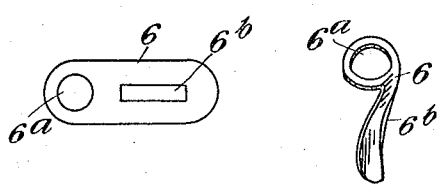
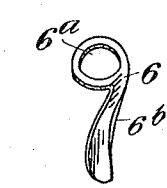
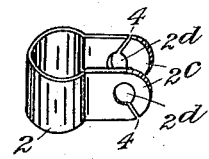
Fig.7.   Fig.8.   Fig.9.
Inventor
Oliver W. J. Chester
by Wilkinson & Giusta
Attorneys Patented Aug. 21, 1923.

1,465,806

UNITED STATES PATENT OFFICE.

OLIVER W. J. CHESTER, OF GLENMAGGIE, GIPPSLAND, VICTORIA, AUSTRALIA.

TETHERING PEG.

Application filed November 13, 1922. Serial No. 600,657.

*To all whom it may concern:*

Be it known that I, OLIVER WILLIAM JAMES CHESTER, a subject of the King of Great Britain and Ireland, residing at Glenmaggie, Gippsland, in the State of Victoria, Commonwealth of Australia, have invented certain new and useful Improvements in Tethering Pegs; and I do hereby declare the following to be a full, clear, and exact description of the invention, such as will enable others skilled in the art to which it appertains to make and use the same.

My invention relates to articles each having a stem and a connection thereto,—such as a tethering peg carrying the chain of an animal trap. The means for fixing the stems where required, as in the ground, vary and to these means my invention does not relate; but it relates to means which enable the chain or the like to rotate around the peg. Then in the case of an animal trap, an animal in the trap would be able to rotate the connection, without that chance of detaching the peg which would exist with non-rotatable connections. I am aware of a rotatable connection which is slidable along the peg, but slidable connections have disadvantages, and mine cannot slide. Tethering pegs are frequently hammered into the soil, and in many cases hammering distorts the heads and interferes with the connections, but it does not interfere with mine. In the accompanying drawings I illustrate my invention, but the forms and some details of the elements could be varied within the scope of my claims.

Figures 1 and 2 show upper parts of pegs having my improvements, the chains to, for example, the traps, being omitted. Figure 3 shows a peg head without an attachment. Figure 4 shows a peg clamping band before it is bent into shape. Figure 5 shows the peg band bent into shape, but with its tongues not fully closed together. Figure 6 is a sectional view of a modified band. Figure 7 shows a band keeper before it is bent into shape. Figure 8 shows the keeper in working shape. Figure 9 shows a band as used with a keeper.

I show on one peg an enlarged head (dotted in Figure 3) but enlarged heads are not new; I provide such a head in some cases to protect parts under it against hammer blows which miss the head. In the drawings 1 indicates the peg stem, $1^a$ its top, and $1^b$ a projection from the stem. This projection is made integral with and encircles the stem in my preferred construction, and is hereinafter called a rib. Adjoining the rib is a band 2, having a body which embraces the stem, and is rotatable thereon. In the preferred form the band has a slot $2^b$ into which rib $1^b$ projects so that the band cannot slide along the peg. In Figure 6 the band is recessed at $2^a$ instead of having the slot $2^b$, the recess being entered by rib $1^b$ so that the same effect is secured. Projecting from the band are tongues $2^c$ which, when the parts are assembled, are pressed and held together. The tongues are engaged by the chain or other connection. I provide slits 4 in the tongues extending in any direction desired to the holes of the latter; the slit parts can be bent aside to allow of a chain link or ring being engaged in the tongue holes, then the bent parts can be returned to normal to lock the link or ring in.

5 shows a ring, and $5^a$ an S hook as examples of connecting members through tongue holes $2^d$ or the like. In the case of the tongues in Figure 2 they may at will be fixed together as by brazing.

When the band of Figure 1 is used, a band keeper is not required, but as the band of Figure 2 merely abuts against one side of the peg rib, I use a keeper 6 to hold the band on the peg. This keeper has a hole $6^a$ to be passed over the peg stem to cause the keeper to bear or abut against the rib on the side opposite to that carrying the band. The keeper has a slot $6^b$ through which the band tongues $2^c$ are extended; thus the keeper prevents the band sliding longitudinally of the peg.

I claim:—

1. A tethering peg having a projection near its head, a rotatable band clamping the peg and having a slot into which the projection extends to prevent the band sliding longitudinally, a pair of tongues projecting from the band and being apertured for connection thereto of a chain or the like.

2. A peg having a projection on its stem, a rotatable band clamping the stem and prevented from sliding longitudinally by engagement with the projection, tongues projecting from the band, and means in the tongues to allow of connections thereto.

3. A peg having a rib encircling its stem, a slotted rotatable band clamping the peg, the rib entering the slot, apertured tongues projecting from the band, and means in the tongues to allow of connections thereto.

4. A peg having a projection near its head, a recessed rotatable band clamping the peg, the projection entering the recess, apertured tongues projecting from the band, and means in the tongues to allow of connections thereto.

In witness whereof I have hereunto set my hand.

OLIVER W. J. CHESTER.

Witness:
  JEAN SIMMONS.